United States Patent [19]

Reichow

[11] Patent Number: 5,046,739
[45] Date of Patent: Sep. 10, 1991

[54] ERGONOMIC HANDLE FOR GAME CONTROLLER

[75] Inventor: James R. Reichow, Brooklyn Park, Minn.

[73] Assignee: Dynasound Organizer, Inc., New Brighton, Minn.

[21] Appl. No.: 606,630

[22] Filed: Oct. 31, 1990

[51] Int. Cl.⁵ .............................................. A63B 71/00
[52] U.S. Cl. ............................................... 273/148 B
[58] Field of Search ....................... 273/148 R, 148 B; 248/314, 201, 346

[56] References Cited

U.S. PATENT DOCUMENTS 4,573,682  3/1986  Mayon ............................ 273/148 B

OTHER PUBLICATIONS

Exhibits "A" and "B"; photos of SEGA GENESIS Game Controller.

*Primary Examiner*—Theatrice Brown
*Assistant Examiner*—Raleigh W. Chiu
*Attorney, Agent, or Firm*—Merchant, Gould, Smith, Edell, Welter & Schmidt

[57] ABSTRACT

An ergonomic handle for a game controller forms a pocket which receives the controller. The handle is made of a substantially moldable, pliable material which provides support and cushioning to the hands, fingers and thumbs while manipulating the controls for preventing cramping and stiffness. The handle wraps around the back and sides of the controller to retain the handle on the controller. The handle portion includes cushioning sides and a ridge around the front for supporting the base of the thumb. The face of the controller remains substantially open so that the thumb and fingers have free access to the controls. The rear of the handle has a cushioning shoulder forming a recess receiving the fingertips of fingers which wrap around the back of the handle. The shoulder and recess support the fingers in a natural holding position. In addition, a small peak portion for each hand extends down from the bottom of the handle for a lower finger of each hand to wrap around and rest against.

12 Claims, 4 Drawing Sheets

ERGONOMIC HANDLE FOR GAME CONTROLLER

BACKGROUND OF THE INVENTION

1. Field of the Invention

The present invention relates to ergonomic handles for hand-held controllers such as those commonly used with video games.

2. Description of the Prior Art

Hand-held controllers with fingertip controls are well known and commonly used as remote controls and with video games and portable electronic games, such as, for example, Nintendo ® Game Boy ™. The controllers typically have a rectangular box configuration which is generally held by both hands so that the control buttons and/or control levers on the front of the controller may be manipulated by the thumbs and fingers.

The generally squared shape of controllers does not fit particularly well with the contours of hands and fingers so that holding the controller may not be particularly comfortable for users. The housing is commonly made of metal or rigid plastic which provides no padding to the palms, thumbs or fingers. The rigid housing also provides little protection for the controller should it be dropped. With extended periods of use, the hands and fingers may stiffen or develop cramps from gripping the controller and manipulating the controls. In particular, it has been found that the palms and the thumb have inadequate support or cushioning against the hard exterior of the controller and are likely to cramp.

Sculpting the controller to more closely follow the contour of the hand improves the ergonomics so that the hands are in a natural holding position, however the controller still provides inadequate cushioning for the hands and fingers and inadequate cushioning should the controller be dropped. Plastics or other materials providing sufficient pliability to lessen cramping and provide adequate padding do not lend themselves for use as a housing so that detachable handles may be required.

It can be seen then, that a device is needed which provides adequate support and cushioning for the hands while using a hand-held controller. It can also be seen that a device is needed which can be added to existing controllers to provide cushioning and support.

SUMMARY OF THE INVENTION

The present invention is directed to ergonomic handles for hand-held controllers. The handle attachments slide onto an end of the controller to fit the hand of the user while operating the game.

The detachable ergonomic handles provide needed support and cushioning for the palms of the hand while holding the controller. The controller slides into a pocket formed in the handle which also retains the controller during use. The handle has cushioning at the sides of the controller for the palms. The front portion of the handle has a ridge extending along the edge of the handle for supporting the base of the thumbs and which borders the open face of the controller so that manipulation of the controls by the thumbs and fingers is unobstructed.

The rear portion of the handle behind the controller has a sculpted shoulder extending around the edge to support the palms and fingers which wrap around the back of the handle. A recess receives the fingertips and allows the fingers to rest against the shoulder in a natural position.

The bottom of the handle has at least one peak extending downward to support the palm and to provide a rest pad for at least one of the lower fingers to wrap around during use.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings, wherein like reference numerals and letters indicate corresponding elements throughout the several views.

DETAILED DESCRIPTION OF THE PREFERRED EMBODIMENTS

Figure 2:
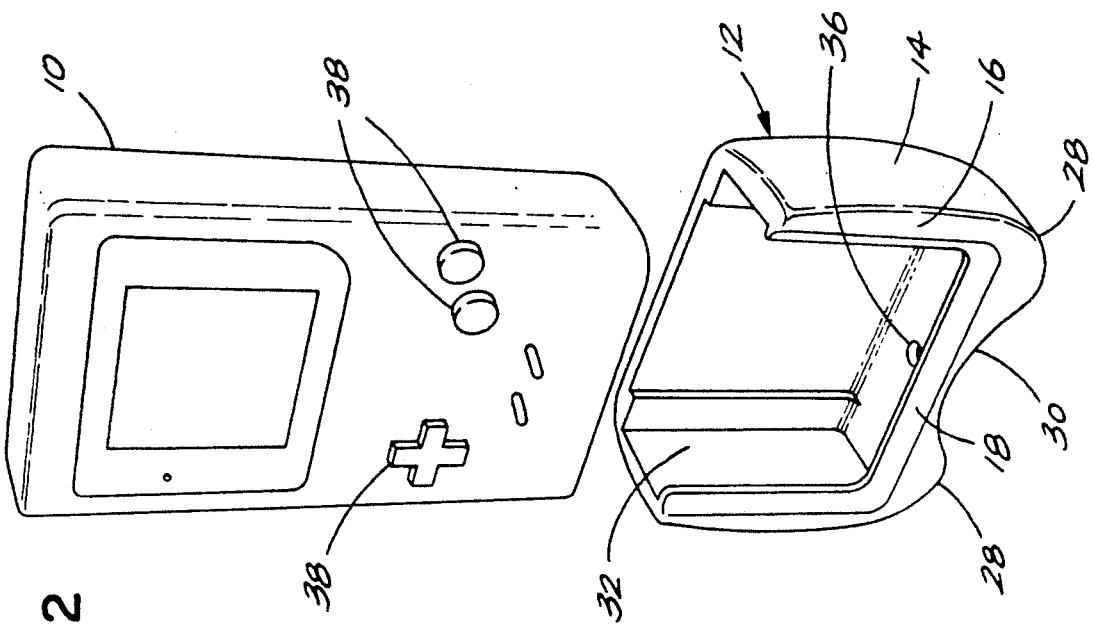
FIG. 2 shows a perspective view of the controller and the ergonomic handle device shown in FIG. 1, detached from the controller.
Figure 1:
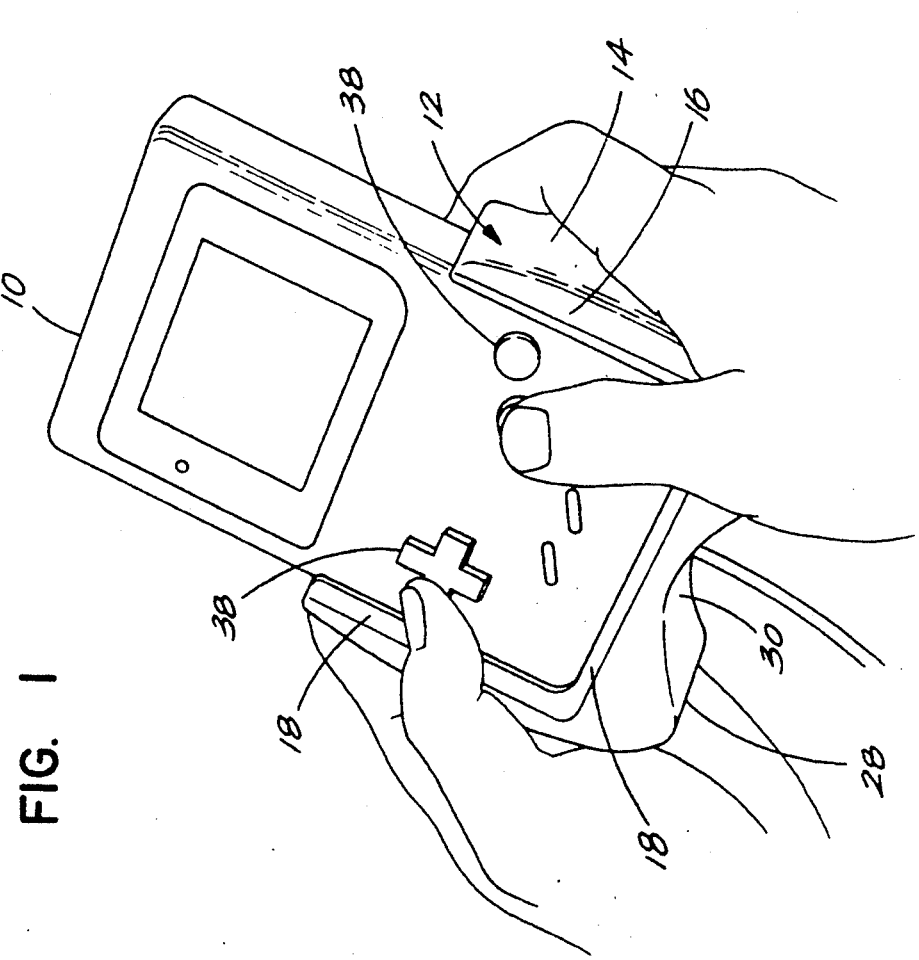
FIG. 1 shows a perspective view of a hand-held controller having an attached ergonomic handle device according to the principles of the present invention.

Referring now to the drawings, and in particular to FIG. 1, there is shown a hand-held controller 10 for a portable electronic video game having a detachable ergonomic handle device 12 attached to the controller 10 and being held with two hands in a typical operating fashion. As shown in FIG. 2, the handle device 12 forms a generally rectangular pocket 32 into which the controller 10 slides during use, as shown in FIG. 1. The pocket 32 is preferably sculpted to fit the shape of the outer housing of the controller 10 with sufficient friction so that the controller 10 does not slide out of the pocket 32 during normal use. To provide adequate support and cushioning, in the preferred embodiment, the handle 12 is composed of a slightly pliable material such as rubber or a moldable grade elastomer having a durometer reading of between 55 and 85 percent.

Figure 4:
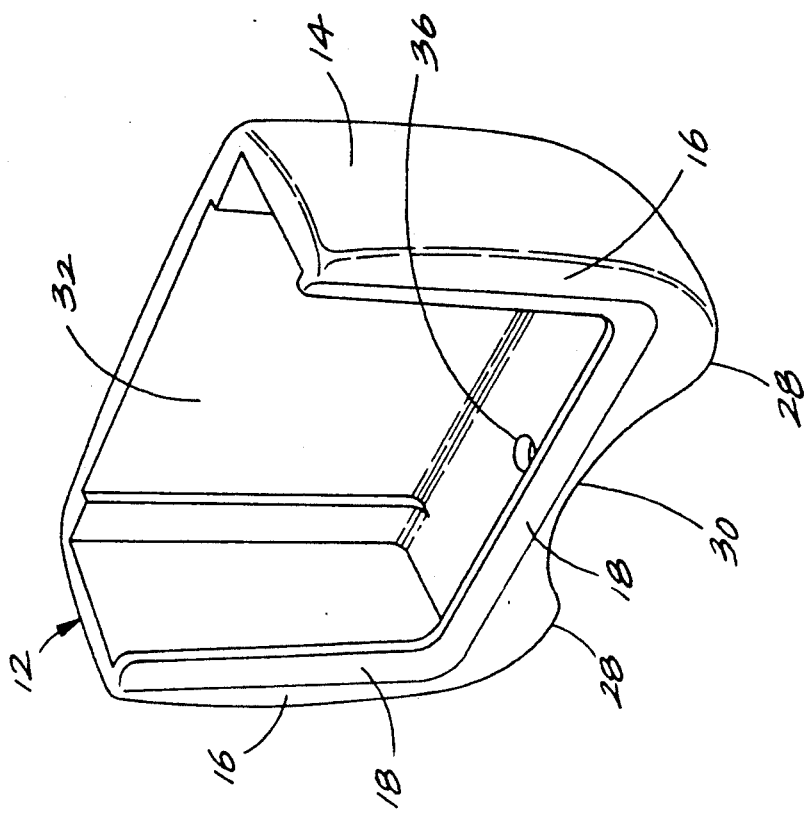
FIG. 4 shows a top front perspective view of the ergonomic handle device shown in FIG. 3.

To support the palms and base of the thumb, the handle 12 has cushioning side portions 14. The side portions 14 are sculpted to bulge out slightly and generally fit the contour of the palm of the hand. The side portions 14 curve into a ridge 16 extending around the outer edge of the front of the handle 12, as shown in FIGS. 2 and 4. The ridge 16 is proximate a sculpted recess 18 which borders an opening on the front of the controller 10. The recess 18 retains the face of the controller 10 sufficiently while allowing the thumb unrestricted movement to work the controls.

Figure 3:
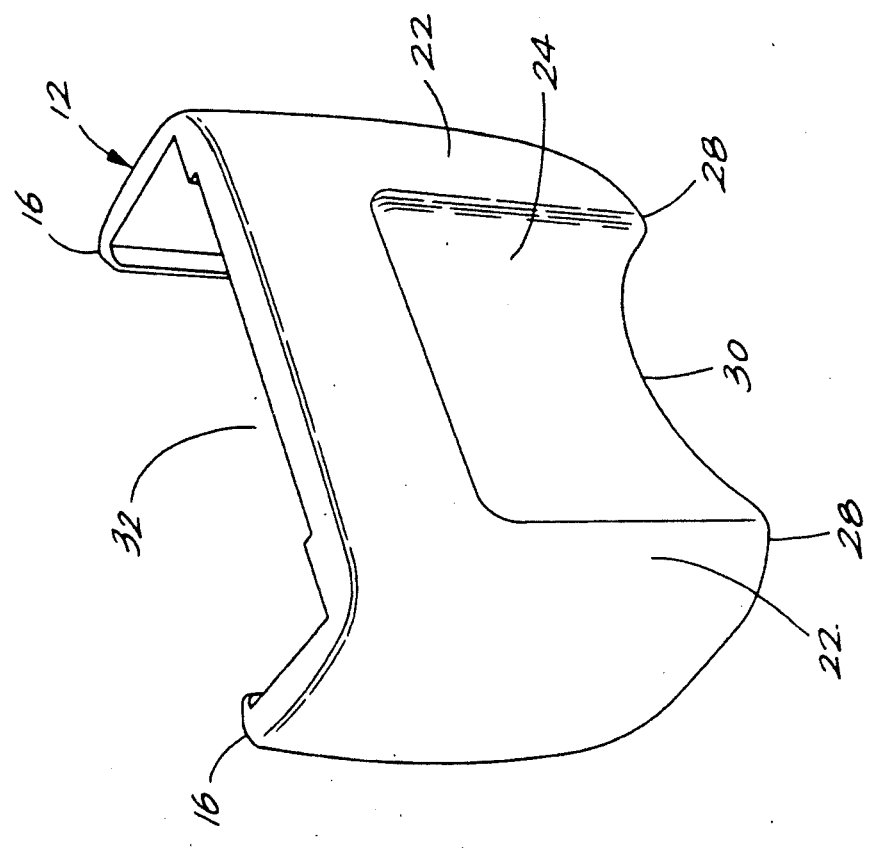
FIG. 3 shows a top rear perspective view of the ergonomic handle device shown in FIG. 2.

As shown in FIG. 3, the side portions 14 curve around to the back of the handle device 12 to form a rear shoulder portion 22. The rear shoulder 22 follows along the sides and top of the handle 12 to form a center recessed pad portion 24. When held, the fingers wrap over the shoulder 22 so that the fingertips rest in the center recess 24 against the rear shoulder 22, should that position be most comfortable for the user.

A pair of slightly peaked portions 28 extend down from the bottom of the handle 12 with a concave section 30 projecting slightly inward toward the controller 10 and extending between the peaks 28. The concave section 30 allows the lower finger or fingers to wrap under the handle 12 so that the fingers may rest against the peak portions 28 or concave section 30. The concave section 30 preferably includes an orifice 36 allowing a cord, such as may be used with external headphones for video games, to extend from the controller 10 and through the handle 12.

It can be appreciated that the handle 12 wraps around a portion of the front, back, sides and bottom of the controller 10. Since the handle 12 is preferably composed of a pliable plastic material which provides cushioning around the controller 10, it can be appreciated that the handle 12 provides protection to the controller 10 should it be dropped or bumped. The pliable material also adapts to varying hand sizes so that the handle 12 can be used comfortably by children as well as adults.

Figure 5:
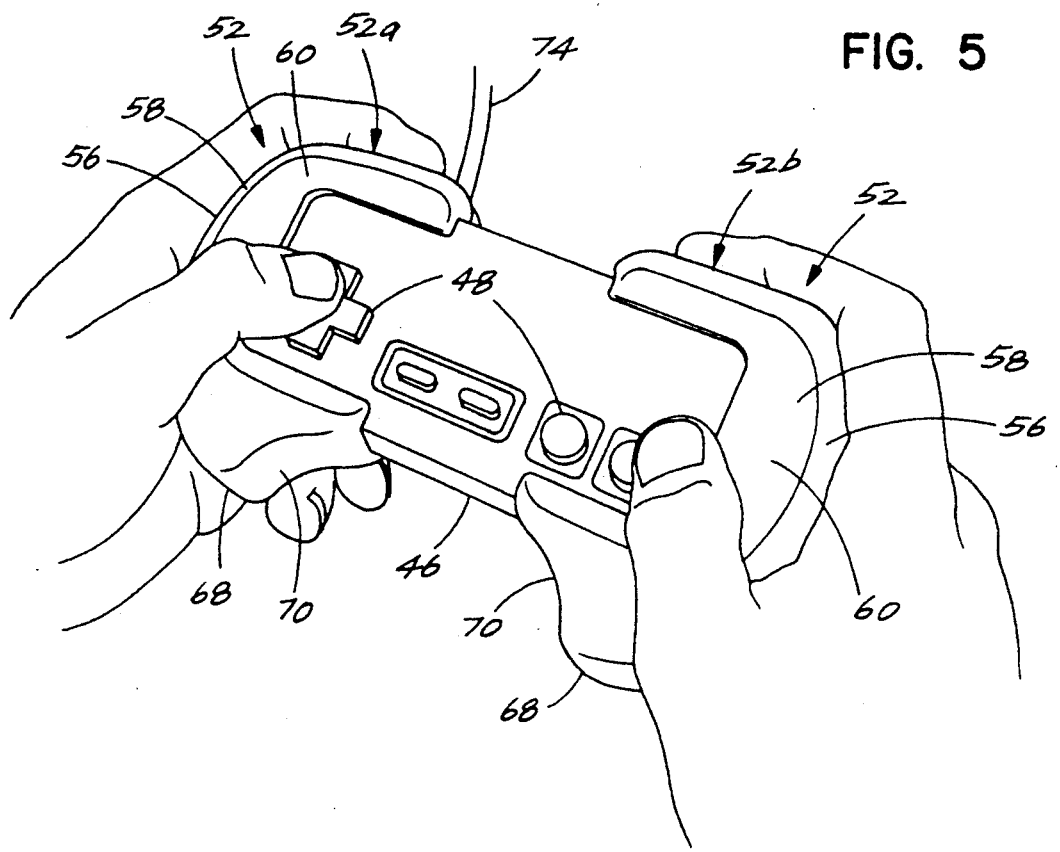
FIG. 5 shows a perspective view of a hand-held controller and a second embodiment of attached ergonomic handles according to the principles of the present invention.

In FIG. 5 there is shown a controller 46 for a video game having a second embodiment of an ergonomic handle device 52 attached thereto. The handle 52 has a pair of handle attachments 52a and 52b adapted for the left and right hands, respectively. For clarity, reference will be made to the features of only one handle 52, the second handle portion being substantially a mirror image of the other.

For the controller 46, wherein the width is substantially greater than the height, the handles 52a and 52b slide onto the ends rather than up onto the bottom of the controller. The handles 52a and 52b provide adequate comfort to users and leave the controller face open so that access to controls 48 is not restricted. Each handle portion 52 forms a generally rectangular pocket 54 for the end of the controller 46 to slide into.

Figure 6:
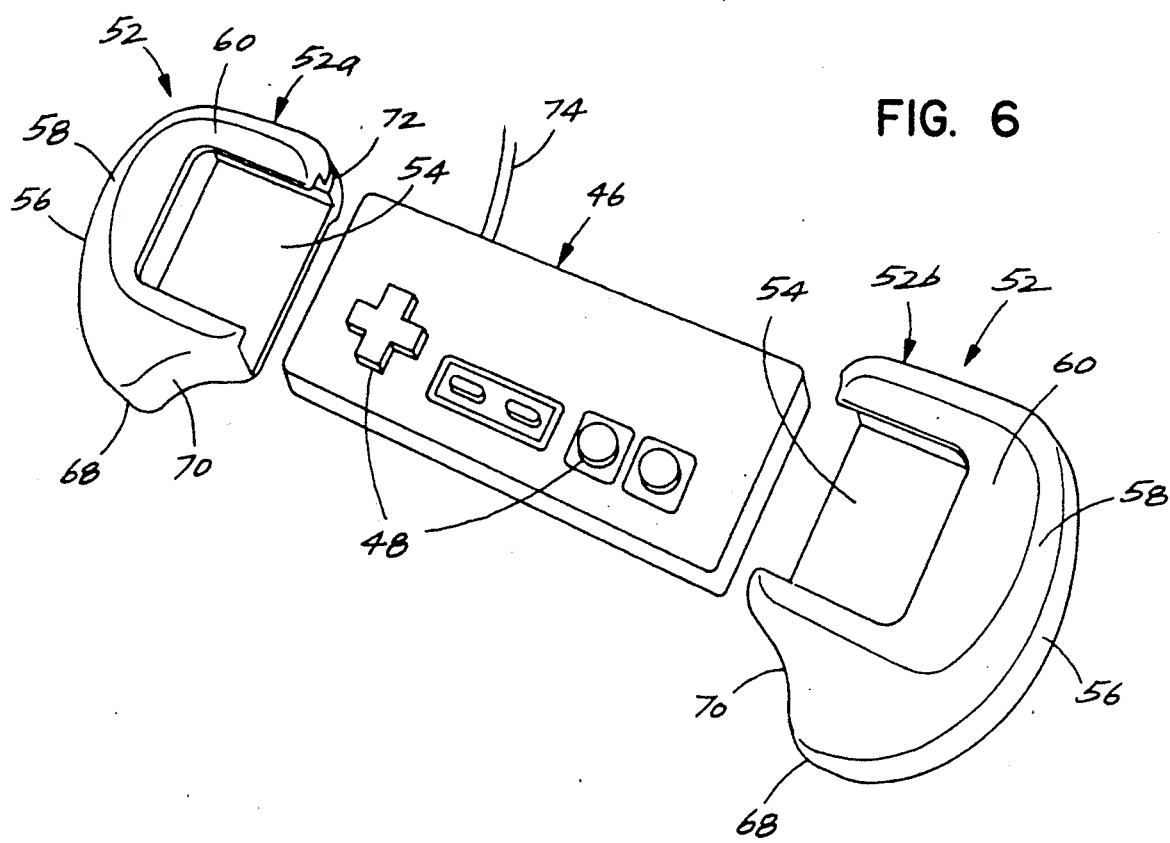
FIG. 6 shows an exploded view of the controller and handles shown in FIG. 5, detached from the controller.
Figure 7:
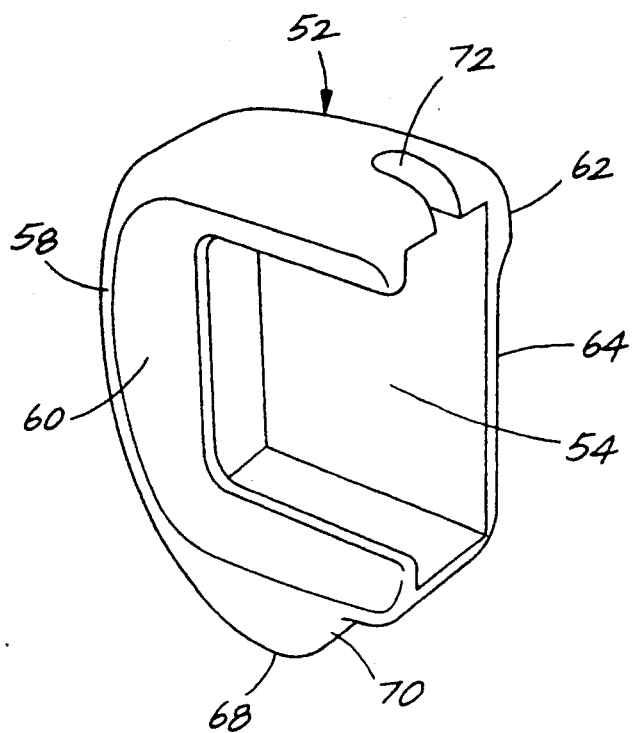
FIG. 7 shows a top front perspective view of an ergonomic handle shown in FIG. 5; and, FIG. 8 shows a top rear perspective view of the ergonomic handle shown in FIG. 7.

As shown in FIGS. 5 and 6, at the side of each handle portion 52a and 52b, there is formed a sculpted side portion 56 for the palm of the hand to rest against. The sculpted side portion 56 provides support and cushioning so that the palm remains comfortable during use. As shown in FIG. 7, a front ridge 58 along the edge of the handle 52 provides support and cushioning for the thumb and hand, while keeping the face of the controller 46 and access to controls 48 unobstructed. The ridge 58 has a recess 60 formed proximate thereto in order to receive the tips of the thumb and fingers when not manipulating the controls 48.

Figure 8:
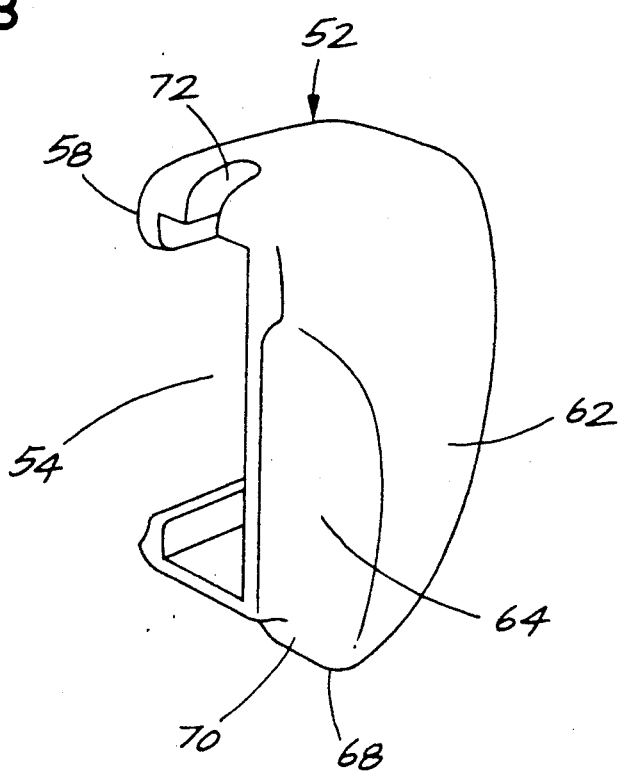

As shown in FIG. 8, the rear of each handle portion 52 has a sculpted shoulder 62 raised along the side and to portion of each handle 52. Inside the shoulder 62 is a padded recess 64 which extends away from the shoulder 62. The padded recess 64 normally receives the fingertips when the controller 46 is held, depending on the size of the user's hands and/or the user's holding preference. The shoulder 62 and padded recess 64 provide adequate cushioning to increase comfort for the user when grasping the controller 46, especially during extended periods of use.

At the bottom of each handle portion 52, a peak portion 68 extends downwardly. The peak 68 provides cushioning and a rest pad 70 on the inner side of each peak for at least one lower finger, should the user desire to wrap it around and under the handle 52, as shown in FIG. 5.

As shown in FIGS. 7 and 8, a nook 72 may be formed in the handle 52 to accommodate a power cord 74 for the controller 46 as shown in FIG. 5. It can be appreciated that the nook may be moved to a number of locations on the handles 52 to accommodate various cord configurations.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An ergonomic handle for a hand-held controller, the controller having controls on a front face thereof, the handle comprising:
   a) controller holding means;
   b) a side portion adapted for fitting the palm of the hand;
   c) a front ridge portion extending along a side of the controller and adapted for providing support for the base of the thumb;
   d) a bottom portion having a curving segment curving inward with the palm and forming a peak, the bottom portion curving back toward the device and adapted for providing a resting pad for at least one finger; and
   e) a back portion having an outer shoulder forming a recess in the center of the back portion adapted for receiving one or more fingers wrapping around the back of the handle.

2. An ergonomic handle according to claim 1, wherein the controller holding means wraps around at least three sides of the controller.

3. An ergonomic handle according to claim 2, wherein the controller holding means frictionally engages the controller.

4. An ergonomic handle according to claim 1, wherein the controller holding means wraps around the two sides and bottom of the controller.

5. An ergonomic handle according to claim 1, wherein the handle is comprised of a moldable grade elastomer.

6. An ergonomic handle according to claim 1, wherein the handle is made of a moldable grade elastomer.

7. An ergonomic handle fitting to a hand-held controller, the controller having finger controls on the face thereof, comprising:
   a) controller retaining means wrapping around the sides and bottom of the controller and around the edges of the front and back of the controller;
   b) palm supporting means along each side of the controller for supporting the palms of the hands during operation;

c) lower finger support means extending from the bottom of the controller, having a concave face for receiving the lower fingers;

d) thumb supporting means along the edges of the front of the handle and adapted for supporting the base of the thumb;

e) back finger supporting means extending along the back of the controller and forming a shoulder along the sides of the handle and a recess for receiving one or more fingertips.

8. An ergonomic handle according to claim 7, wherein the concave face has an orifice extending therethrough providing for extending a cord through the handle.

9. An ergonomic handle according to claim 7, wherein the handle is detachable from the controller.

10. A pair of detachable controller handles adapted for attaching to a hand-held controller at opposing ends thereof, each attachment comprising:

a) controller attaching means wrapping around the end and a portion of the top and bottom of the controller;

b) a ridge extending along the end and bottom of each handle and curving slightly to fit the palm of the hand;

c) a peak portion extend below the handle for supporting at least one lower finger;

d) a shoulder portion extending around the back of each handle substantially even with the edge of the end of the controller forming a recess for receiving at least one fingertip.

11. A pair of handles according to claim 10, wherein the handles are made of a moldable grade elastomer.

12. A pair of handles according to claim 10, wherein a first handle is adapted for the left hand and a second handle is adapted for the right hand.

* * * * *